United States Patent Office 3,558,327
Patented Jan. 26, 1971

3,558,327
PROCESS OF QUICK TEMPERING CEREAL GRAINS
Harley E. Watkins, Golden, Colo., assignor to Pet Incorporated, St. Louis, Mo., a corporation of Delaware
No Drawnig. Filed Mar. 20, 1968, Ser. No. 714,412
Int. Cl. A23l *1/10*
U.S. Cl. 99—80            6 Claims

ABSTRACT OF THE DISCLOSURE

A process of quick tempering grain to eliminate the usual hold period while the moisture content of the grain comes to equilibrium comprising the steps of raising the moisture content of the grain above that required for milling, and passing the grain through a microwave field to reduce the moisture level of the grain to that required for milling. The grain is ready for milling immediately after leaving the microwave field.

BACKGROUND OF THE INVENTION

It is well known that in the dry milling of cereal grains, such as wheat into flour, the grain must first be conditioned to facilitate the separation of the bran and germ from the endosperm. The normal and accepted practice in the industry is to adjust the moisture content of the grain to the level dictated by the individual mill requirements, then allowing a grain period of several hours, often overnight, to equilibrate. The main disadvantage of this method is the time elapsed before the milling process can be started. This results in frequent plant shut downs for a crew of men must come to the plant several hours in advance of the start-up to temper the grain. Also, this method requires considerable storage facilities for the grain being tempered. Another common procedure for tempering is through the addition of steam. This reduces the time before milling but the possibility exists that the grain will be harmed from excessive heat.

SUMMARY OF THE INVENTION

The present invention comprises a process of tempering grain without the usual long hold time or the use of steam so that the grain is ready for milling immediately after treatment which comprises raising the water level of the grain above that required for milling and passing the grain through a microwave field to reduce the water level to the milling requirement.

DETAILED DESCRIPTION

This invention will permit milling of the grain almost immediately after adjusting the moisture content to the desired level. Essentially the process is to spray the grain with water, treat the grain with microwave energy, then mill the grain with essentially no holding time between steps.

Microwave power is varied relative to treatment (exposure) time and water addition and removal to yield properly tempered grain as shown in the following example.

EXAMPLE NO. 1

Water is added to 2000 grams of wheat to raise the moisture content of the grain to 16.0%. The grain is conveyed through a microwave cavity and exposed to 20 kilowatt power level at a wave length of 915 megacycles/sec. for 40 seconds. The wheat is immediately run through a Brabender Quadromat Sr. experimental mill under standard conditions. For comparison, a sample from the sale lot of wheat is tempered under standard conditions and held overnight before milling on the same equipment under the same conditions as used for the microwave treated wheat previously.

The following results are obtained:

TABLE NO. 1

| | Control | Microwave treated |
|---|---|---|
| Moisture of grain, percent | 12.0 | 12.0 |
| Moisture of tempered grain, percent | 14.4 | 14.6 |
| Amount of grain milled, grams | 1,500 | 1,500 |
| Stream recovery weights, in grams: | | |
|   Bran | 283.0 | 270.0 |
|   Shorts | 210 | 190 |
|   Clear flour | 240 | 250 |
|   Patent flour | 747 | 780 |
| | 1,480 | 1,490 |
| Rate of extraction (flour/total recovered), percent | 67 | 71 |
| Flour analyses: | | |
|   Ash, flour, percent | 0.428 | 0.464 |
|   Moisture, flour, percent | 11.95 | 14.0 |
|   Protein, flour, percent | 12.25 | 12.25 |
| Baking data: | | |
|   Loaf volume, cc | 900 | 950 |
|   Total score | 69 | 71 |
| Milling time, min | 20 | 20 |

The present invention is suitable for use with wheat, mullet, rye, soya, sorghum, rice, rice grass, wild rice, corn, oats, barley and adlay. Each of these grains has a particular mill moisture level and the microwave treatment is modified to bring the grain to this desired moisture level. With wheat normally this level is about 14–15% moisture so that it is convenient to raise the moisture of the wheat to about 16% prior to treating it in a microwave field. This treatment reduces the moisture level to the desired 14 to 15%, after which it is milled.

The energy level of the microwave field can vary from about 1 kw. to 100 kw. with a preferred energy level of about 15 kw. to about 30 kw. The treatment time can vary from about 10 sec. to 15 min. with a preferred time of about 30 sec. to about 5 min. The frequency of the microwave field can vary from about 300 mHz. to 300,000 mHz. with a preferred frequency of about 900 mHz. to about 2500 mHz. Microwave equipment manufacturers publish tables for their equipment which relate the evaporation rate of moisture to the energy level, frequency and treatment time of the microwave field. With this data one can calculate the power level and treatment time necessary to remove the correct amount of moisture to arrive at a final product of a given moisture level for milling. Suitable commercial equipment can be used in practicing the process of this invention.

Normally there is no upper limit on the moisture level of the grain prior to treatment, but it is expensive to remove too much moisture and also longer treatment times or higher energy levels can produce different effects in the final flour milled from the grain. It is preferred that the moisture level of the grain be raised between about 0.10% and about 10% above mill moisture level prior to its entering the microwave field. However, it is emphasized that these treatment times and power levels do not effect the milling characteristics other than in the fashion hereinbefore described.

The present invention affords a considerable advantage to millers of grain in that they can reduce their storage equipment a substantial amount because the grain does not have to be held after treatment with water to allow the water to come to equilibrium throughout the grain. Also, the process can be operated continuously and special crews do not need to come in a day ahead of time to prepare the grain for milling on the succeeding day. The grain can be milled immediately after it is removed from the microwave field but holding the grain after treatment does not adversely effect it insofar as its milling characteristics are concerned.

Table No. 1 demonstrates that the grain treated with microwave energy to temper the same is not inferior in its final milling characteristics or the amount of flour recovered to a conventionally tempered grain. In fact, there is some slight improvement in the rate of extraction of flour from the grain using the microwave treatment.

This invention is intended to cover all changes and modifications of the examples of the invention herein chosen for purposes of the disclosure, which do not constitute departures from the spirit and scope of the invention.

What is claimed is:

1. A process of tempering grain comprising the steps of:
   (a) providing grain having a moisture content at least about 0.10% above the moisture content at which it is to be milled,
   (b) exposing said grain to a microwave field for a time period and at an energy level sufficient to reduce the moisture content of the grain to that at which it is to be milled, whereby the grain can be milled without a conventional holding period.

2. The process of claim 1 wherein the grain is continuously processed and passed from the microwave field to a milling station without substantial holding.

3. The process of claim 1 wherein the moisture level is raised from about 0.10% to about 10.0% above mill moisture level prior to its entering the microwave field.

4. The process of claim 1 wherein the microwave has a frequency of about 900 mHz. to about 2500 mHz., a power level of about 1 kw. to about 100 kw., and the grain is treated for about 30 sec. to about 5 min.

5. The process of claim 4 wherein the moisture level is raised from about 0.10% to about 10.0% above mill moisture level prior to its entering the microwave field.

6. The process of claim 1 wherein the grain treated is wheat and the moisture level of the product entering the microwave field is from about 12% to about 17%, the microwave field has a frequency of about 900 mHz. to about 2500 mHz., the power level is about 15 kw. to about 30 kw., and the grain is treated at the rate of about 15 to about 40 pounds/hour/kilowatt hour of energy applied.

References Cited

UNITED STATES PATENTS

| | | | |
|---|---|---|---|
| 1,740,892 | 12/1929 | Gillespie | 99—80 |
| 2,515,409 | 7/1950 | Jones et al. | 99—80 |
| 2,964,408 | 12/1960 | Gates | 99—80 |

RAYMOND N. JONES, Primary Examiner